May 2, 1933.  F. A. PFEIFER  1,906,487
THERMOSTAT
Filed Dec. 26, 1930
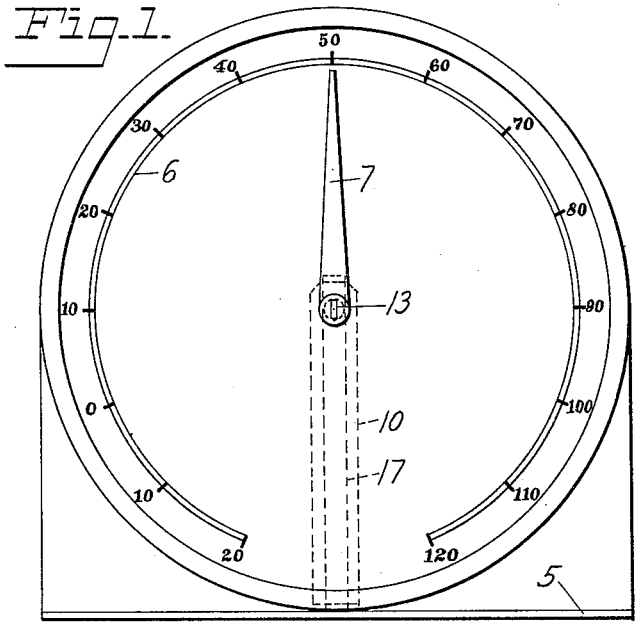
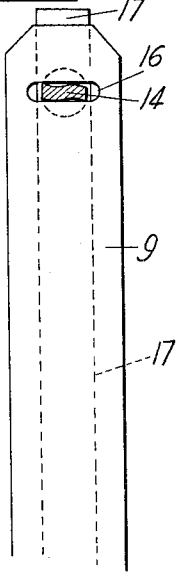
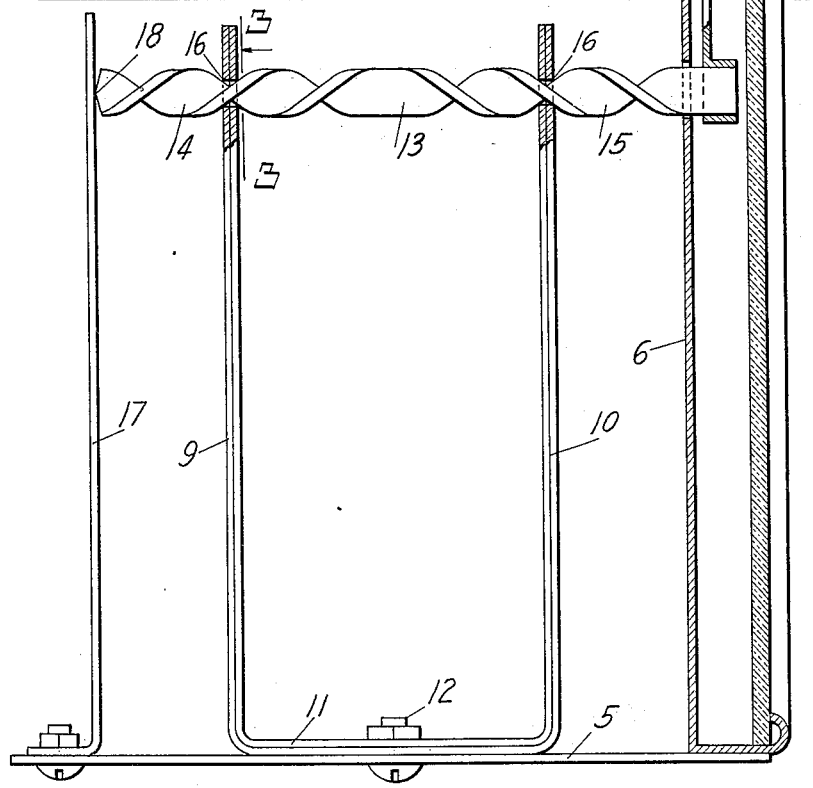
INVENTOR.
FERDINAND A. PFEIFER.
by
his ATTORNEY.

Patented May 2, 1933

1,906,487

UNITED STATES PATENT OFFICE

FERDINAND A. PFEIFER, OF SPRINGFIELD, OHIO; LOUISE PFEIFER, EXECUTRIX OF SAID FERDINAND A. PFEIFER, DECEASED, ASSIGNOR TO HERSELF, INDIVIDUALLY

THERMOSTAT

Application filed December 26, 1930. Serial No. 504,813.

This invention relates to a thermostat and one object of the invention is to provide a simple highly efficient thermostat which can be produced at a low cost.

A further object of the invention is to provide such a thermostat in which there will be no appreciable lost motion between the actuating member and the thermostatic member, thereby causing the actuating member to respond accurately to changes in temperature.

A further object of the invention is to provide such a thermostat having a rotatable actuating member which will not be subjected to end thrust.

Other objects of the invention will appear as the device is described in detail.

In the accompanying drawing Fig. 1 is a front elevation of a thermometer embodying my improved thermostat; Fig. 2 is a sectional view taken through such a thermometer showing the thermostat in elevation and partly broken away; and Fig. 3 is a section taken on the line 3—3 of Fig. 2.

In the drawing I have illustrated one embodiment of my invention and have shown the same as applied to a thermometer of the dial type but it will be understood that this particular embodiment has been chosen for the purpose of illustration only and that the invention may take various forms and may be utilized for various purposes.

In that embodiment of the invention here illustrated it is shown as a part of a thermometer which comprises a base 5, an upright dial 6, a pointer 7 and a transparent closure 8 for the dial and pointer. The pointer 7 is operatively connected with an actuating member which in turn is connected with two thermostatic members which are so arranged that they will be moved in opposite directions by their expansion or contraction. The connection between the actuating member and the two thermostatic members is such that the movement of the latter in opposite directions will impart rotatory movement to the actuating member without imparting endwise movement or end thrust thereto.

In its preferred form the thermostat comprises two thermostatic bars 9 and 10, which, in the present instance, are bimetallic bars, and these bars are so arranged that variations in temperature will cause the same to move in opposite directions. Each thermostatic bar is mounted at one end on a fixed support and in the present construction the two thermostatic bars are formed by bending a single bimetallic bar into a substantially U-shape. The transverse member 11 of this U-shaped structure is secured to a supporting structure, such as the base 5, a single bolt 12 being sufficient for this purpose. It will be obvious, however, that the thermostatic bars 9 and 10 may be separately formed and may be separately attached to the supporting structure.

The actuating memebr 13 extends transversely to the thermostatic bars and is supported thereby. This actuating member comprises a flat bar having its end portions twisted in opposite directions to provide the same with oppositely turned spirals 14 and 15. The free ends of the thermostatic bars 9 and 10 are provided with apertures, here shown as elongated openings 16 extending transversely to the thermostatic bars and adapted to receive the respective spirals of the actuating member. The openings 16 are of such a character that the spirals will fit snugly therein but will be freely movable with relation to the thermostatic bars as those bars are moved toward or from each other but will have no appreciable play in the openings. Consequently when the thermostatic members move toward each other they will act on the respective spirals to rotate the actuating member in one direction and when the thermostatic bars move away from each other they will act on the spirals to rotate the actuating member in the opposite direction. The movement of the thermostatic members in opposite directions equalizes the thrust exerted on the actuating member thereby and thus prevents any end thrust on the actuating member and permits the same to rotate freely without appreciable endwise movement.

One end of the actuating member extends freely through a central opening in the dial and is operatively connected with the pointer 7 of the thermometer. In the present instance, this pointer is directly secured to the actuating member. Inasmuch as the spirals must fit into openings 16 of the thermostatic members in such a manner as to be movable therein there is a possibility that the thermostatic members may have a slight movement lengthwise of the spirals which, while very slight, would cause minor variations in the movement of the part actuated by the actuating member. When the thermostat is so mounted that the actuating member is in substantially vertical position the latter will be held by gravity in contact with the thermostatic members so that these will have no movement with relation thereto prior to their operative engagement with the spirals. However, when the thermostat is so arranged that the actuating member is in approximately a horizontal position I prefer to provide a light yieldable pressure against one end of the actuating member to hold the spirals normally in contact with the edges of the openings. As here shown, a flat spring 17 is mounted on the base 5 and bears lightly against the rear end of the actuating member, which is slightly pointed, as shown at 18, to reduce to a minimum the frictional contact. The pressure of this spring while sufficient to hold the actuating member in the desired position, is so light that it will not have any appreciable influence upon the operation of the actuating member by the thermostatic members.

While I have shown and described one embodiment of my invention I wish it to be understood that I do not desire to be limited to the details thereof as various modifications may occur to a person skilled in the art. For example, it will be obvious that if the actuating or spiral element is held against rotation and the thermostatic element is disconnected from the supporting structure the movements of the two members of the thermostatic element will cause the latter to rotate about the spiral element.

Having now fully described my invention, what I claim as new and desire to secure by Letters Patent, is:

1. A device of the character described comprising a thermostatic element having two substantially parallel members, one of which is movable toward and from the other by variations in temperature, said members having openings therethrough, an elongated element extending through the openings in said members and having a spiral arranged in the opening in said movable member, said movable member having a part to engage said spiral and cause one of said elements to rotate with relation to the other element when said movable member moves toward or from the other member.

2. A device of the character described comprising a thermostatic element having two substantially parallel members movable toward and from each other by variations in temperature and having openings therethrough, and an elongated element extending through the openings in said members and having oppositely turned spirals, said members having parts to engage the respective spirals and cause one of said elements to be rotated about the axis of said elongated element when said members are moved toward or from each other.

3. A thermostat comprising two thermostatic members so arranged that they will be moved in opposite directions by expansion or contraction and having openings therein, and a rotatable actuating member supported in said openings, said thermostatic members being movable with relation to said actuating member in the direction of its length, said actuating member and said thermostatic members having parts cooperating to rotate said actuating member when said thermostatic members are moved in opposite directions.

4. A thermostat comprising two thermostatic members so arranged that they will be moved in opposite directions by expansion or contraction, and an actuating member having oppositely turned spirals connected with the respective thermostatic members, said thermostatic members having parts acting on said spirals to impart rotatory movement to said actuating member when said thermostatic members are moved in opposite directions.

5. A thermostat comprising two thermostatic members so arranged that they will be moved in opposite directions by expansion or contraction, and a flat bar having its end portions twisted in opposite directions to form spirals, said thermostatic members having elongated openings in which the respective spirals are mounted.

6. A thermostat comprising two substantially parallel thermostatic bars each mounted at one end on a fixed support and having an aperture spaced from said fixed support, said bars being so arranged that the apertured portions thereof will be moved in opposite directions by their expansion or contraction, and a member having oppositely turned spirals mounted in the apertures of the respective bars.

7. A thermostat comprising two substantially parallel thermostatic bars each mounted at one end on a fixed support and so arranged that the free ends of the two bars will be moved in opposite directions by their expansion or contraction, an actuating member having oppositely turned spirals at the respective ends thereof, said thermostatic bars having near their free ends openings to receive the respective spirals and so shaped that the movement of said bars in opposite directions will rotate said actuating member.

8. A thermostat comprising two thermostatic members so arranged that they will be moved in opposite directions by expansion or contraction, an actuating member supported by said thermostatic members and extending transversely thereto, said actuating member and said thermostatic members having parts cooperating to rotate said actuating member when said thermostatic members are moved in opposite directions, and a yieldable device acting on said actuating member to take up any end play between the same and said thermostatic members.

9. A thermostat comprising two substantially parallel thermostatic bars each mounted at one end on a fixed support and so arranged that the free ends of the two bars will be moved in opposite directions by their expansion or contraction, an actuating member having oppositely turned spirals at the respective ends thereof, said thermostatic bars having near their free ends openings to receive the respective spirals and so shaped that the movement of said bars in opposite directions will rotate said actuating member, and a spring bearing lightly against one end of said actuating member.

10. In a thermometer comprising a supporting structure, a dial and a pointer to move over said dial, a pair of thermostatic members mounted on said supporting structure for movement in opposite directions by expansion or contraction, and an actuating member operatively connected with said pointer and having oppositely turned spirals connected with the respective thermostatic members, said thermostatic members having parts acting on said spirals to impart rotatory movement to said actuating member when said thermostatic members move in opposite directions.

11. In a thermometer comprising a supporting structure, a dial and a pointer to move over said dial, a pair of thermostatic members mounted on said supporting structure for movement in opposite directions by expansion or contraction and provided with slots, an actuating member operatively connected at one end with said pointer and having oppositely turned spirals mounted in the respective slots, and a spring acting on the other end of said actuating member to take up end play.

In testimony whereof, I affix my signature hereto.

FERDINAND A. PFEIFER.